US012035211B2

(12) United States Patent
Zhang

(10) Patent No.: US 12,035,211 B2
(45) Date of Patent: Jul. 9, 2024

(54) COMMUNICATION METHOD AND APPARATUS, COMPUTER-READABLE MEDIUM, AND ELECTRONIC DEVICE

(71) Applicant: TENCENT TECHNOLOGY (SHENZHEN) COMPANY LIMITED, Guangdong (CN)

(72) Inventor: Zhuoyun Zhang, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 309 days.

(21) Appl. No.: 17/585,400

(22) Filed: Jan. 26, 2022

(65) Prior Publication Data
US 2022/0150678 A1 May 12, 2022

Related U.S. Application Data

(63) Continuation of application No. PCT/CN2020/128173, filed on Nov. 11, 2020.

(30) Foreign Application Priority Data

Jan. 7, 2020 (CN) .......................... 202010014254.4

(51) Int. Cl.
*H04W 4/50* (2018.01)
*H04W 8/18* (2009.01)
(Continued)

(52) U.S. Cl.
CPC .............. *H04W 4/50* (2018.02); *H04W 8/18* (2013.01); *H04W 12/08* (2013.01); *H04W 48/18* (2013.01)

(58) Field of Classification Search
CPC .... H04L 45/302; H04L 47/283; H04W 12/08; H04W 24/02; H04W 4/50; H04W 48/18; H04W 8/18
See application file for complete search history.

(56) References Cited

U.S. PATENT DOCUMENTS

2017/0317894 A1  11/2017  Dao et al.
2019/0357301 A1  11/2019  Li et al.

FOREIGN PATENT DOCUMENTS

| CN | 109417534 A | 3/2019 |
| CN | 109818868 A | 5/2019 |
| CN | 110166929 A | 8/2019 |

OTHER PUBLICATIONS

ETSI MEC Leadership Team; "ETSI MEC: An Introduction, (almost) everything you want to know about ETSI MEC", Dec. 23, 2023, online: <portal.etsi.org/Portals/0/TBpages/MEC/Docs/ETSI-MEC-Public-Overview_Generic.pdf> (Year: 2023).*

(Continued)

*Primary Examiner* — Nader Bolourchi
(74) *Attorney, Agent, or Firm* — ARENTFOX SCHIFF LLP

(57) ABSTRACT

A communication method of an edge computing platform in which an application function is deployed is provided. The edge computing platform is connected to a network exposure function-lite. The network exposure function-lite is connected to a network exposure function-central deployed in a core network. In the communication method, a capability invocation request is received from the application function. When the capability invocation request corresponds to a request to acquire wireless network information, a subscription request for the wireless network information is transmitted to an access network side based on the capability invocation request. The wireless network information fed back by the access network side is received in response to the subscription request. Further, the application function is notified of the wireless network information.

20 Claims, 6 Drawing Sheets

(51) Int. Cl.
*H04W 12/08* (2021.01)
*H04W 48/18* (2009.01)

(56) References Cited

OTHER PUBLICATIONS

ETSI GS MEC 009 V3.2.1 (Jul. 2022); "Multi-access Edge Computing (MEC); General principles, patterns and common aspects of MEC Service APIs", online: <https://www.etsi.org/deliver/etsi_gs/MEC/001_099/009/03.02.01_60/gs_MEC009v030201p.pdf> (Year: 2022).*
Wikipedia, Multi-access edge computing, online: <http://en.wikipedia.org/wiki/ Multi-access edge computing> (viewed on Feb. 16, 2024, 7:50 AM ET) (Year: 2024).*
Supplementary European Search Report issued in Application No. 20911335.6 dated Oct. 14, 2022, 11 pages.
Huawei et al: "5GC capability exposure to the edge application servers", 3GPP Draft; S6-200131, 3rd Generation Partnership Project (3GPP), Mobile Competence Centre ; 650, Route Des Lucioles ; F-06921 Sophia-Antipolis Cedex ; France vol. SA WG6, No. Hyderabad, India; Jan. 13, 2020-Jan. 17, 2020, Jan. 6, 2020, pp. 1-4.
Sony: "KI #3, New Sol: Low latency exposure API solution", 3GPP Draft; S2-2003676, 3rd Generation Partnership Project (3GPP), Mobile Competence Centre ; 650, Route Des Lucioles ; F-06921 Sophia-Antipolis Cedex ; France, vol. SA WG2, No. e-meeting ;Jun. 1, 2020-Jun. 12, 2020, May 20, 2020, pp. 1-7.
Sony: "KI#3: Evaluation and interim conclusion", 3GPP Draft; S2-2007605, 3rd Generation Partnership Project (3GPP), Mobile Competence Centre ; 650, Route Des Lucioles ; F-06921 Sophia-Antipolis Cedex ; France, vol. SA WG2, No. E (E-meeting); Oct. 12, 2020-Oct. 23, 2020, Oct. 2, 2020, pp. 1-8.
Office Action in CN202110815588.6, mailed Feb. 29, 2024, 8 pages.

* cited by examiner

COMMUNICATION METHOD AND APPARATUS, COMPUTER-READABLE MEDIUM, AND ELECTRONIC DEVICE

RELATED APPLICATIONS

This application is a continuation of International Application No. PCT/CN2020/128173, entitled "COMMUNICATION METHOD AND APPARATUS, COMPUTER-READABLE MEDIUM, AND ELECTRONIC DEVICE" and filed on Nov. 11, 2020, which claims priority to Chinese Patent Application No. 202010014254.4, entitled "COMMUNICATION METHOD AND APPARATUS, COMPUTER-READABLE MEDIUM, AND ELECTRONIC DEVICE" and filed on Jan. 7, 2020. The entire disclosures of the prior applications are hereby incorporated by reference in their entirety.

FIELD OF THE TECHNOLOGY

This application relates to the field of computer and communication technologies, including a communication method and apparatus, a computer-readable medium, and an electronic device.

BACKGROUND OF THE DISCLOSURE

In a mobile communication scenario, it may be necessary to expose some network information to an Application Function (AF) entity, so that the AF can perform corresponding application layer processing based on the information. However, if a delay of the AF invoking the information is too long, the information will be invalid and the subsequent application layer processing will be affected. Especially, in an edge computing scenario, a Multi-access Edge Computing (MEC) platform is usually deployed in a location closer to a terminal user, that is, far away from a location of a core computer room of an operator, resulting in a long delay in network information exposure.

SUMMARY

Communication methods and apparatuses, non-transitory computer-readable mediums, and electronic devices are provided in embodiments of this disclosure, which can reduce a delay of network information exposure and meet delay requirements of an application functions in an edge computing platform for network information.

Other features and advantages of this disclosure become clearer through the following detailed descriptions, or may be understood partially by the practice of this disclosure.

In an embodiment, a communication method of an edge computing platform in which an application function is deployed is provided. The edge computing platform is connected to a network exposure function-lite. The network exposure function-lite is connected to a network exposure function-central deployed in a core network. In the communication method, a capability invocation request is received from the application function. When the capability invocation request corresponds to a request to acquire wireless network information, a subscription request for the wireless network information is transmitted to an access network side based on the capability invocation request. The wireless network information fed back by the access network side is received in response to the subscription request. Further, the application function is notified of the wireless network information.

In an embodiment, a communication method of an edge computing platform in which an application function is deployed is provided. The edge computing platform is connected to a network exposure function-lite. The network exposure function-lite is connected to a network exposure function-central deployed in a core network. In the communication method, a subscription request is acquired for wireless network information transmitted by the network exposure function-lite. The subscription request is transmitted by the network exposure function-lite according to a capability invocation request transmitted by the application function. The wireless network information is monitored according to the subscription request. When the wireless network information meeting the subscription request is monitored, the wireless network information is transmitted to the network exposure function-lite, so that the network exposure function-lite feeds the wireless network information back to the application function.

In an embodiment, a communication apparatus for a network exposure function-lite of an edge computing platform in which an application function is deployed is provided. The edge computing platform is configured to connect to the network exposure function-lite, and the network exposure function-lite is configured to connect to a network exposure function-central deployed in a core network. The communication apparatus includes processing circuitry configured to receive a capability invocation request from the application function. The processing circuitry is configured to, when the capability invocation request corresponds to a request to acquire wireless network information, transmit a subscription request for the wireless network information to an access network side based on the capability invocation request. The processing circuitry is configured to receive the wireless network information fed back by the access network side in response to the subscription request. The processing circuitry is further configured to notify the application function of the wireless network information.

In an embodiment, a communication apparatus for a base station of an edge computing platform in which an application function is deployed is provided. The edge computing platform is configured to connect to a network exposure function-lite. The network exposure function-lite is configured to connect to a network exposure function-central deployed in a core network. The communication apparatus includes processing circuitry configured to acquire a subscription request for wireless network information transmitted by the network exposure function-lite. The subscription request is transmitted by the network exposure function-lite according to a capability invocation request transmitted by the application function. The wireless network information is monitored according to the subscription request. When the wireless network information meeting the subscription request is monitored, the wireless network information is transmitted to the network exposure function-lite, so that the network exposure function-lite feeds the wireless network information back to the application function.

In some embodiments, a non-transitory computer-readable medium is provided. The non-transitory computer readable storage medium stores instructions which when executed by a processor cause the processor to perform any of the communication methods. For example, a communication method applied to an edge computing scenario on a side of a network exposure function-lite, or implementing a communication method applied to an edge computing scenario on a side of a base station or an operation administration and maintenance system of the base station.

An electronic device is provided in an embodiment of this disclosure, including one or more processors; and a storage apparatus configured to store one or more programs, the one or more programs, when executed by the one or more processors, causing the one or more processors to implement a communication method applied to an edge computing scenario on a side of a network exposure function-lite, or implement a communication method applied to an edge computing scenario on a side of a base station or an operation administration and maintenance system of the base station.

In the embodiments of this disclosure, a network exposure function-lite is deployed, the network exposure function-lite is connected to an edge computing platform and a network exposure function-central, so that the network exposure function-lite can implement a subscription processing for wireless network information between an application function and an access network side, that is, receive a capability invocation request transmitted by the application function, transmit a subscription request for wireless network information to the access network side based on the capability invocation request, and notify the application function of wireless network information fed back by the access network side. The network exposure function-lite can be deployed in a location closer to the edge computing platform, and therefore, a delay for the application function to acquire the subscribed wireless network information can be reduced, that is, a delay of network information exposure is reduced, so that delay requirements of the application function in the edge computing platform for the network information can be met.

It is to be understood that the foregoing general descriptions and the following detailed descriptions are only exemplary, and cannot limit this disclosure.

BRIEF DESCRIPTION OF THE DRAWINGS

Accompanying drawings herein are incorporated into a specification and constitute a part of this specification, show embodiments that conform to this disclosure, and are used to describe a principle of this disclosure together with this specification. Apparently, the accompanying drawings in the following description show only some embodiments of this disclosure, and a person of ordinary skill in the art may still derive other accompanying drawings from these accompanying drawings without creative efforts. In the accompanying drawings.

DESCRIPTION OF EMBODIMENTS

Exemplary implementations are now described more comprehensively with reference to the accompanying drawings. However, the exemplary implementations may be implemented in various forms, and it is not to be understood as being limited to the examples described herein. Conversely, the implementations are provided to make this disclosure more comprehensive and complete, and more comprehensively convey the idea of the exemplary implementations to a person skilled in the art.

In addition, the described features, structures or characteristics may be combined in one or more embodiments in any appropriate manner. In the following descriptions, exemplary details are provided to give a more comprehensive understanding of the embodiments of this disclosure. However, a person skilled in the art is to be aware that, the technical solutions in this disclosure may be implemented without one or more of the specific details, or another method, apparatus, or step may be used. In other cases, well-known methods, apparatuses, implementations, or operations are not shown or described in detail, to avoid obscuring the aspects of this disclosure.

The block diagrams shown in the accompanying drawing are merely functional entities and do not necessarily correspond to physically independent entities. That is, the functional entities may be implemented in a software form, or in one or more hardware modules or integrated circuits, or in different networks and/or processor apparatuses and/or microcontroller apparatuses.

The flowcharts shown in the accompanying drawings are merely examples for descriptions, do not need to include all content and operations/steps, and do not need to be performed in the described orders either. For example, some operations/steps may be further divided, while some operations/steps may be combined or partially combined. Therefore, an actual execution order may change according to an actual case.

In a mobile application scenario, in order to ensure the use experience of an application function (AF), certain network information, such as a network congestion condition and a real-time user plane delay, needs to be exposed to the application function in real time, so that the AF can perform corresponding application layer processing based on the network information, for example, adjusting the resolution of a video, changing the level of automatic driving, and so on.

Figure 1:
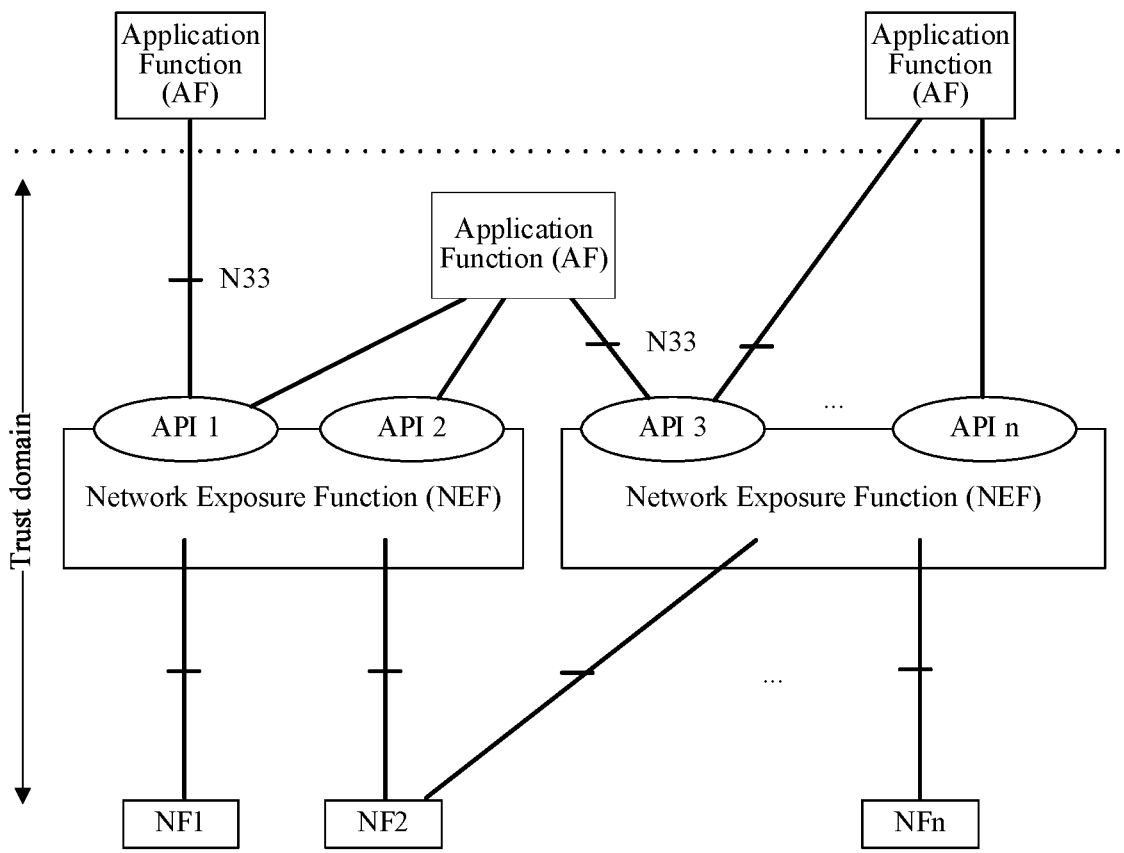
FIG. 1 is a schematic diagram of an exemplary network capability exposure architecture according to related technologies.

Exemplarily, FIG. 1 is a schematic diagram of an exemplary network capability exposure architecture according to related technologies. As shown in FIG. 1, in a trust domain, application program interfaces, namely API1, API2, API3, . . . APIn, of a Network Exposure Function (NEF) interact with an application function (AF) through an interface N33 to acquire a capability invocation request of the AF, and expose corresponding network information to the AF according to the capability invocation request. The NEF interacts with various other Network Functions (NFs), namely NF1, NF2, . . . , NFn, of a core network control plane through a service-based interface, so as to acquire specific network information required by the AF. However, in this architecture, although the network information is exposed to the AF through the NEF, the AF is deployed on a Multi-access Edge Computing (MEC) platform, and the MEC platform is generally deployed in a location near a core base station, and a deployment location of the NEF is usually located in a core computer room of an operator. In other words, the location of the NEF is far from that of the MEC platform, which will cause a long network information delay.

However, the long delay of network information scheduling will make the network information invalid, which will affect subsequent application layer processing and optimization solutions, for example, affect adjustment of video resolution, the level change of automatic driving, and the like. As can be seen, the deployment of the MEC in a location closer to the terminal, that is, far away from the core computer room of the operator will increase the delay of network information exposure, which will affect subsequent application layer processing. How to address the delay of the network information exposure is an urgent technical problem to be solved.

In summary, those skilled in the art have not analyzed the implementation process of network information exposure, and the above technical problems are not common knowledge for those skilled in the art. Therefore, it is difficult for those skilled in the art to discover and raise the above technical problems. In the embodiments of this disclosure, the process of network information exposure is analyzed, and the above technical problems are found.

A communication method and apparatus, a computer-readable storage medium, and an electronic device are provided in the embodiments of this disclosure, which can reduce a delay during network information exposure.

Figure 2:
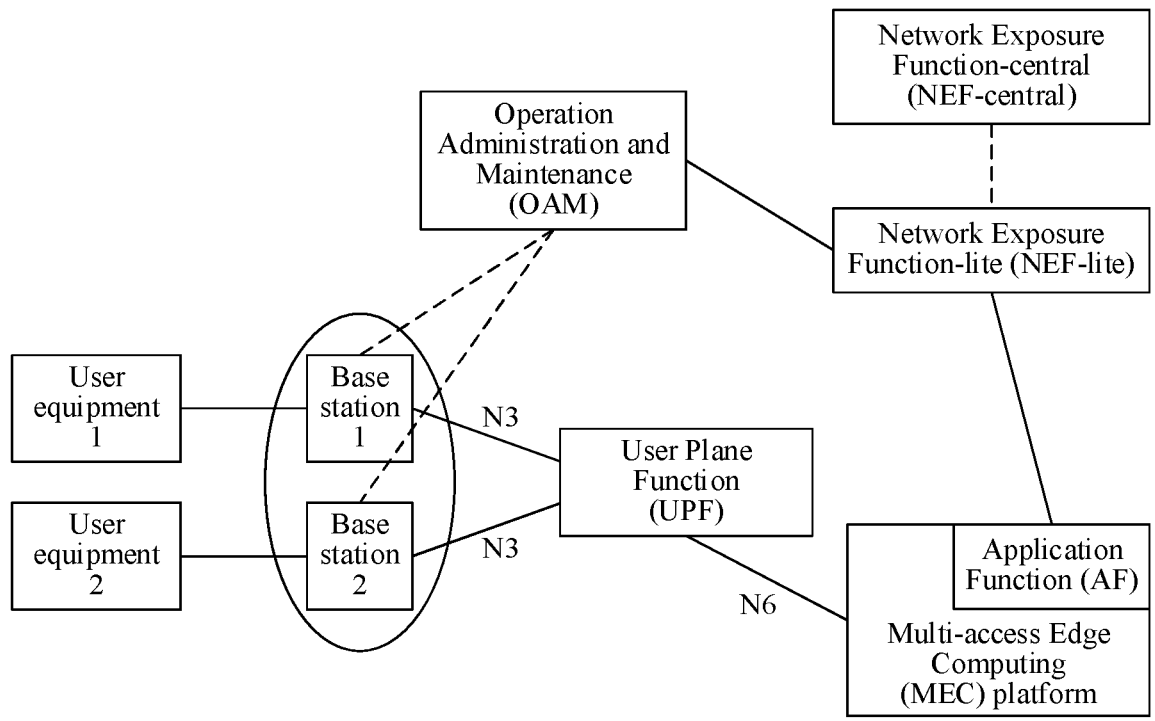
FIG. 2 is a schematic diagram of an exemplary system architecture to which a technical solution according to an embodiment of this disclosure is applicable.

FIG. 2 is a schematic diagram of an exemplary system architecture to which a technical solution according to an embodiment of this disclosure is applicable.

As shown in FIG. 2, the system architecture may include a User Equipment (UE) (e.g., a UE 1 and a UE 2 as shown in FIG. 2, where the UE may be a smartphone, a tablet computer, a portable computer, a desktop computer, a smart watch, and the like), a base station (e.g., a base station 1 and a base station 2 as shown in FIG. 2), a User Plane Function (UPF), an edge computing platform (MEC), an application function (AF), a Network Exposure Function-lite (NEF-lite), a Network Exposure Function-central (NEF-central), and an Operation Administration and Maintenance (OAM) system. The base station (the base station 1 and the base station 2 as shown in FIG. 2) is connected to the UPF through an N3 interface, the UPF is connected to the edge computing platform through an N6 interface, the AF is deployed on the MEC platform, the NEF-lite is connected to the OAM system, the AF is connected to the NEF-lite, and the NEF-lite is connected to the NEF-central.

In an embodiment of this disclosure, the UPF shown in FIG. 2 may be an Intermediate UPF (I-UPF) with an Uplink Classifier (ULCL) function, or a UPF of an anchor point. The NEF-lite may be deployed near the location of the MEC, or in the same computer room as the MEC. The NEF-lite is configured to implement capability exposure for the MEC platform. A main exposure scenario is exposure of wireless information of a base station serving an MEC platform. In the system architecture shown in FIG. 2, the NEF-lite does not have a direct interface with the base station, but acquires wireless information on the base station side by a connection with an OAM system of the base station. This method can reduce impacts to base station functions and the existing network architecture. The connection between the NEF-lite and the NEF-central can realize the exposure of capabilities of the core network control plane to the MEC platform. That is, after receiving a capability invocation request transmitted by the AF on the MEC platform, the NEF-lite will judge, according to an event identification included in the request, whether the request is related to capabilities of the wireless side (e.g., whether the request is used for requesting to acquire wireless network information). When the request is unrelated to the capabilities of the wireless side, the request is forwarded to the NEF-central, and the NEF-central authenticates and authorizes the request. When accepting the subscription request, the existing capability exposure process will be applied to acquire corresponding capability information according to the subscription request, and a corresponding notification message will be transmitted to the NEF-lite, and then forwarded to the AF by the NEF-lite. In addition, the NEF-lite may not have a direct interface with another Network Function (NF) entity on the core network control plane, and is only connected to the NEF-central. Moreover, the NEF-lite may also invoke capabilities of the NEF-central to authenticate and authorize the AF request.

It is to be understood that the numbers of devices shown in FIG. 2 are merely exemplary. According to implementation requirements, there may be any numbers of user equipments, base stations, UPFs, AFs, and the like.

In some embodiments of this disclosure, the AF may transmit a capability invocation request to the NEF-lite, and the capability invocation request may include an event identification (such as wireless network information that needs to be acquired), event filter information (such as a signal threshold), event report information (such as a maximum number of reports and a minimum report interval), target information (such as a target UE identification, a target UE group identification, Protocol Data Unit (PDU) session information, target cell information, target location area, and a target time period), AF information (such as address information of the AF), and the like. After receiving the capability invocation request, the NEF-lite may perform authorization verification on the AF based on the capability invocation request. When the NEF-lite cannot implement authorization verification on the AF, for example, the NEF-lite does not have a capability of performing authorization verification on the AF, or subscription information of the AF is not imported into the NEF-lite, and then the NEF-lite cannot complete authorization verification on the identity of the application function, the capability invocation request may be transmitted to the NEF-central, and the NEF-central implements authorization verification on the AF, and returns a result to the NEF-lite.

After the authorization verification on the AF succeeds, the NEF-lite may transmit a subscription request to the OAM according to the capability invocation request. After receiving the subscription request, the OAM may determine whether to accept the subscription request, and when not accepting the subscription request, it may feed a response message of rejecting the subscription and a reason for rejecting the subscription back to the AF. When the OAM accepts the subscription request, it may feed back response message agreeing to the subscription. After receiving the response message, the NEF-lite may forward the response message to the AF.

In some embodiments of this disclosure, the OAM has a connection with the base station, and will receive wireless side information reported by the base station. The wireless side information may be information reported periodically or information reported while triggered by a special event. After corresponding wireless network information is monitored according to the subscription request, the monitored wireless network information may be transmitted to the NEF-lite, and then forwarded by the NEF-lite to the AF.

In some embodiments of this disclosure, after receiving the subscription request transmitted by the NEF-lite, the OAM may also transmit the subscription request to a target base station. After receiving the subscription request, the target base station may determine whether to accept the subscription request. When not accepting the subscription request, a response message of rejecting the subscription and a reason for rejecting the subscription may be fed back. When accepting the subscription request, the target base station may feed back a response message agreeing to the subscription. After receiving the response message, the OAM may forward the response message to the NEF-lite, and then the response message is forwarded by the NEF-lite to the AF.

In some embodiments of this disclosure, the wireless network information mentioned in the context may be a wireless network congestion indication, a Quality of Service (QoS) congestion indication, a QoS measurement report, and the like.

Figure 3:
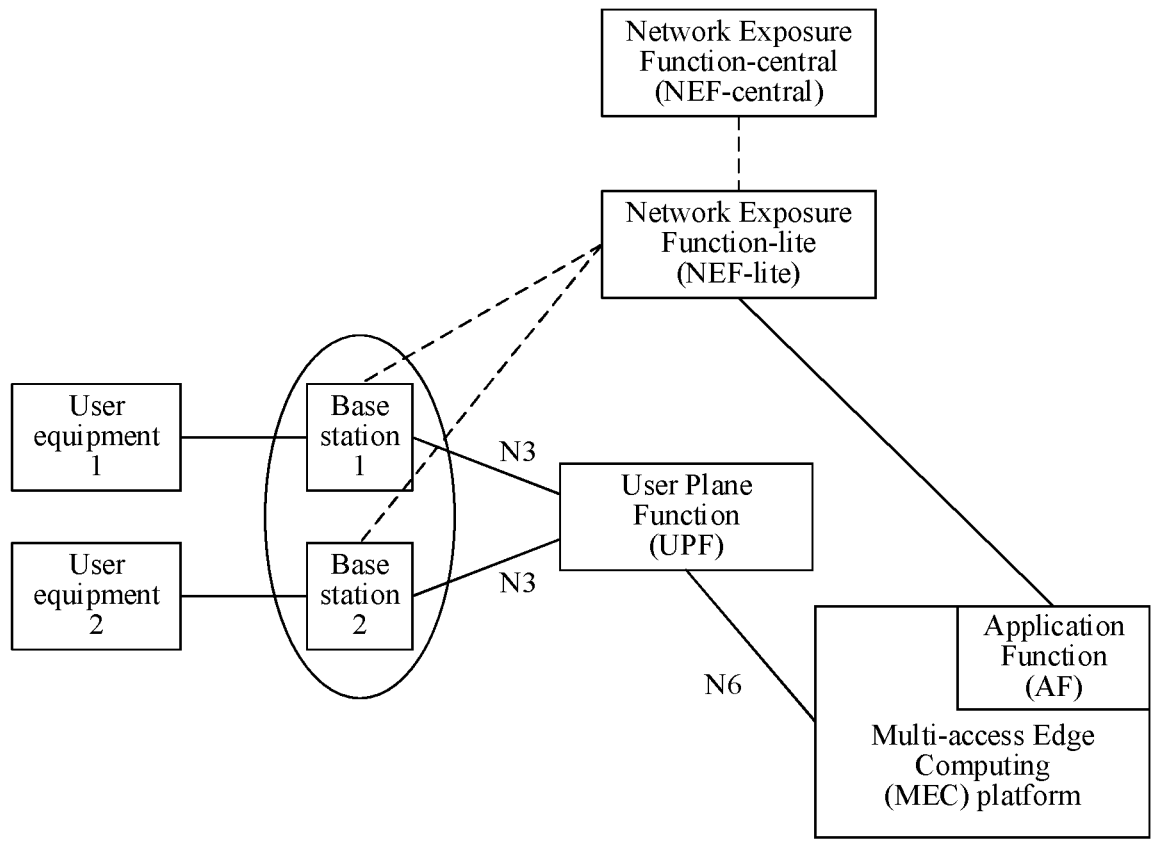
FIG. 3 is a schematic diagram of another exemplary system architecture to which a technical solution according to an embodiment of this disclosure is applicable.

FIG. 3 is a schematic diagram of another exemplary system architecture to which a technical solution according to an embodiment of this disclosure is applicable. As shown in FIG. 3, the system architecture includes a User Equipment (UE) (e.g., a UE 1 and a UE 2 as shown in FIG. 3), a base station (e.g., a base station 1 and a base station 2 as shown in FIG. 3), a User Plane Function (UPF), an edge computing platform (MEC), an application function (AF), a Network Exposure Function-lite (NEF-lite), and a Network Exposure Function-central (NEF-central). The base station (the base station 1 and the base station 2 as shown FIG. 3) is connected to the UPF through an N3 interface, the UPF is connected to the MEC platform through an N6 interface, the AF is deployed on the MEC platform, the AF is connected to the NEF-lite, and the NEF-lite is connected to the NEF-central. In the system architecture shown in FIG. 3, the NEF-lite is directly connected to the base station without the need of an operation administration and maintenance, i.e., an OAM system, and therefore, the delay of information transmission can further be reduced. In some embodiments of this disclosure, after receiving the capability invocation request transmitted by the AF, the NEF-lite may perform authorization verification on the AF based on the capability invocation request. When the NEF-lite cannot implement authorization verification on the AF, for example, the NEF-lite does not have a capability of performing authorization verification on the AF, or subscription information of the AF is not imported into the NEF-lite, and then the NEF-lite cannot complete authorization verification on the identity of the AF, the capability invocation request may be transmitted to the NEF-central, and the NEF-central implements authorization verification on the AF.

After the authorization verification on the AF succeeds, the NEF-lite may transmit a subscription request to the base station according to the capability invocation request. After receiving the subscription request, the base station may determine whether to accept the subscription request, and when not accepting the subscription request, it may feed a response message of rejecting the subscription and a reason for rejecting the subscription back to the NEF-lite. When accepting the subscription request, the base station may feed a response message agreeing to the subscription back to the NEF-lite. After receiving the response message, the NEF-lite may forward the response message to the AF.

In some embodiments of this disclosure, after monitoring corresponding wireless network information according to the subscription request, the base station may transmit the monitored wireless network information to the NEF-lite, which is then forwarded by the NEF-lite to the AF.

In the system architectures shown in FIG. 2 and FIG. 3, the NEF-lite is deployed in a location closer to the MEC platform, and therefore, the delay for the AF to acquire subscribed wireless network information can be reduced, that is, a delay for network information exposure is reduced, thereby meeting delay requirements of the AF in the MEC platform on the network information.

The implementation details of the technical solutions in the embodiments of this disclosure are described below in detail.

Figure 4:
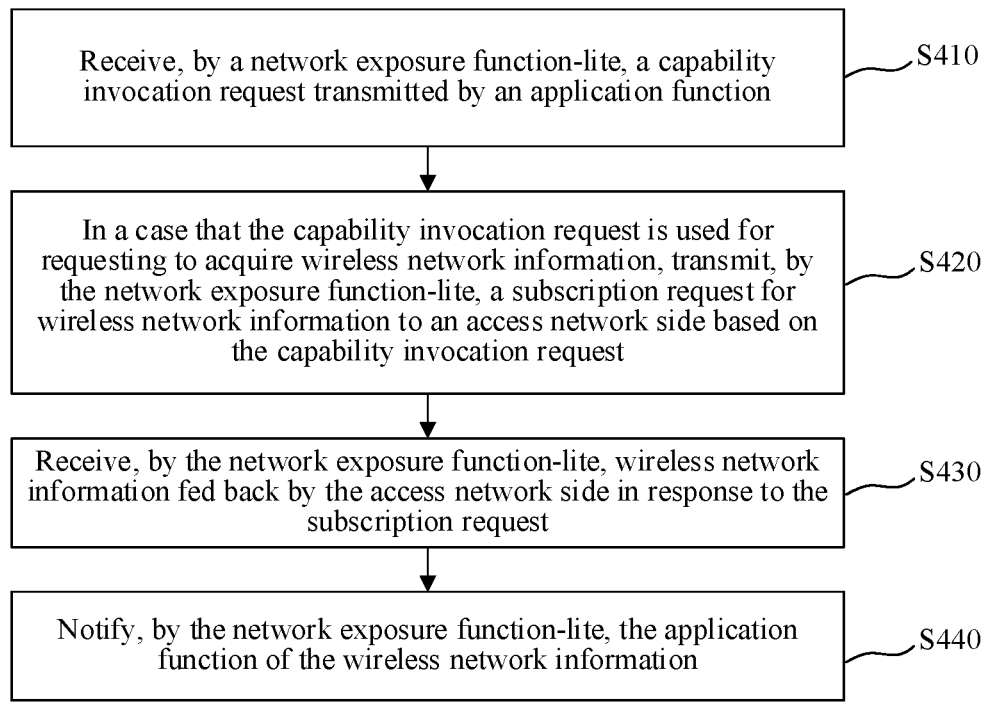
FIG. 4 is a flowchart of a communication method applied to an edge computing scenario according to an embodiment of this disclosure.

FIG. 4 is a flowchart of a communication method applied to an edge computing scenario according to an embodiment of this disclosure, and the edge computing scenario may be the edge computing scenario shown in FIG. 2 or FIG. 3. The communication method applied to an edge computing scenario may be performed by the NEF-lite shown in FIG. 2 or FIG. 3, that is, performed by the network exposure function-lite. Referring to FIG. 4, the communication method applied to an edge computing scenario includes at least step S410 to step S440, which are described in detail as follows.

In step S410, a network exposure function-lite receives a capability invocation request transmitted by an application function.

In the embodiments of this disclosure, the application function may generate a capability invocation request, and transmit the generated capability invocation request to the network exposure function-lite through a network. The capability invocation request may include an event identification (such as wireless network information that needs to be acquired), event filter information (such as a signal threshold), event report information (such as a maximum number of reports and a minimum report interval), target information (such as a target UE identification, a target UE group identification, PDU session information, target cell information, target location area, and a target time period), AF information (such as address information of the AF), and the like.

In step S420, when the capability invocation request is used for requesting to acquire wireless network information, the network exposure function-lite transmits a subscription request for wireless network information to an access network side based on the capability invocation request.

In the embodiments of this disclosure, after receiving the capability invocation request transmitted by the application function, the network exposure function-lite may determine, according to the event identification included in the capability invocation request, whether the capability invocation request is used for requesting to acquire wireless network information. For example, when the event identification is a first value, it is determined that the request is used for requesting to acquire wireless network information. When the event identification is a second value, it is determined that the request is not used for requesting to acquire wireless network information. Both the first value and the second value may be set according to actual conditions. In some embodiments of this disclosure, when the capability invocation request is not used for requesting to acquire wireless network information, the network exposure function-lite may forward the capability invocation request to the NEF-central, that is, to the network exposure function-central, and the network exposure function-central authenticates and authorizes the request. When accepting the subscription request, the network exposure function-central will apply the existing capability exposure process to acquire corresponding capability information according to the subscription request, and transmit a corresponding notification message to the network exposure function-lite, and the network exposure function-lite forwards the notification message to the application function.

In an embodiment of this disclosure, the network exposure function-lite may perform authorization verification on the identity of the application function according to the capability invocation request, and transmit the subscription request to the access network side according to the capability invocation request when the authorization verification on the identity of the application function succeeds. In some embodiments of this disclosure, the network exposure function-lite may acquire a digital certificate of the application function in advance, and then the network exposure function-lite may perform authorization verification on the identity of the application function based on the digital certificate.

In some embodiments of this disclosure, when the network exposure function-lite cannot complete authorization verification on the identity of the application function, the capability invocation request may be transmitted to the network exposure function-central, so that the network exposure function-central performs authorization verification on the identity of the application function, and then the network exposure function-lite may determine, according to a result of the authorization verification of the network exposure function-central on the identity of the application function, whether authorization verification on the identity of the application function succeeds. When the authorization verification on the identity of the application function succeeds, the subscription request may be transmitted to the access network side according to the capability invocation request. In some embodiments, when the N network exposure function-lite does not have a capability of performing authorization verification processing on the function entity, but the authorization verification function is placed on the network exposure function-central side for processing, it may be determined that the network exposure function-lite cannot complete the authorization verification on the identity of the application function. Alternatively, when subscription information of the application function is not imported into the network exposure function-lite, the network exposure function-lite cannot complete authorization verification on the identity of the application function.

In some embodiments of this disclosure, the process of the network exposure function-lite transmitting the subscription request to the access network side according to the capability invocation request may specifically be: determining, according to address indication information included in the capability invocation request, information of at least one target base station corresponding to the subscription request, and then transmitting, based on the information of the at least one target base station, the subscription request to the at least one target base station or an operation administration and maintenance system of the at least one target base station. In other words, the network exposure function-lite first parses out information of one or more target base stations based on address indication information in the capability invocation request, and determines one or more target base stations based on the information of one or more target base stations, then transmits the subscription request to the operation administration and maintenance system of the one or more target base stations.

In some embodiments of this disclosure, the address indication information includes at least one of the following: address information of the application function, information of a target cell, and information of a target location area. For example, a location of the edge computing platform may be determined according to the address information of the application function, and then a base station near the location of the edge computing platform may be regarded as the target base station corresponding to the subscription request. Alternatively, according to the information of a target cell, a base station forming the target cell may be regarded as the target base station corresponding to the subscription request. Alternatively, according to the information of a target location area, a base station whose signal coverage includes the target location area may be regarded as the target base station corresponding to the subscription request.

When the address indication information includes at least two of the address information of the application function, the information of the target cell, and the information of the target location area, candidate base stations may be determined respectively based on the at least two pieces of information, and then the target base station is determined from the candidate base stations. For example, all candidate base stations may be regarded as the target base stations, or a target base station with a better performance may be selected from the candidate base stations.

In some embodiments of this disclosure, when the system architecture shown in FIG. 2, that is, the access network side includes the base station and the operation administration and maintenance system connected to the base station, and the network exposure function-lite is connected to the operation administration and maintenance system of the base station, the network exposure function-lite may transmit the subscription request to the operation administration and maintenance system based on the capability invocation request, and then the operation administration and maintenance system determines whether to accept the subscription request. Of course, after receiving the subscription request, the operation administration and maintenance system may also forward the subscription request to the base station, and then the base station determines whether to accept the subscription request. When the system architecture shown in FIG. 3, that is, the access network side includes the base station, and the network exposure function-lite is connected to the base station, the network exposure function-lite may directly transmit the subscription request to the base station based on the capability invocation request.

In some embodiments of this disclosure, before the network exposure function-lite receives wireless network information fed back by the access network side in response to the subscription request, after the network exposure function-lite transmits the subscription request to the access network side, a subscription response fed back by the access network side may be received, and the subscription response is used for indicating whether the access network side accepts the subscription request. Then, the network exposure function-lite feeds the subscription response back to the application function. In some embodiments, when the subscription response indicates that the access network side rejects the subscription request, the network exposure function-lite may feed rejection reason information back to the application function according to the subscription response. When the subscription response indicates that the access network side accepts the subscription request, the network exposure function-lite may detect whether wireless network information fed back by the access network side in response to the subscription request is received.

When the target base station responds to the subscription request, when all target base stations to which the subscription request is transmitted reject the subscription request, it may be determined that the access network side rejects the subscription request. When at least one target base station accepts the subscription request, it may be determined that the access network side accepts the subscription request. When the operation administration and maintenance system responds to the subscription request, the operation administration and maintenance system may determine, according to a prior configuration file, whether the subscription request needs to be accepted.

Still referring to FIG. 4, in step S430, the network exposure function-lite receives the wireless network information fed back by the access network side in response to the subscription request.

In this case, after receiving the subscription request feedback, the access network side may generate corresponding wireless network information, and then transmit the wireless network information to the network exposure function-lite over the network.

In some embodiments of this disclosure, when the system architecture shown in FIG. 2, that is, the network exposure function-lite is connected to the operation administration and maintenance system of the base station, the network exposure function-lite may receive wireless network information transmitted by the operation administration and maintenance system, where the wireless network information may be wireless network information that meets the subscription request, and is monitored by the base station according to the subscription request forwarded by the operation administration and maintenance system and is transmitted to the operation administration and maintenance system; or may be wireless network information that meets the subscription request and is monitored by the operation administration and maintenance system according to the information reported by the base station. When the system architecture shown in FIG. 3, that is, the network exposure function-lite is directly connected to the base station, the network exposure function-lite may directly receive the wireless network information fed back by the base station in response to the subscription request.

In step S440, the network exposure function-lite notifies the application function of the wireless network information.

In this case, the network exposure function-lite transmits the wireless network information to the application function over the network, and the application function receives the wireless network information.

In some embodiments of this disclosure, after the network exposure function-lite notifies the application function of the wireless network information, the application function may perform application layer processing based on the wireless network information.

In some embodiments of this disclosure, the network exposure function-lite may also make statistics on the wireless network information requested to acquire by the application function, such as the number of invocations, to obtain a statistical result, and then report the statistical result to the network exposure function-central.

The technical solution of the embodiment shown in FIG. 4 illustrates implementation details of the communication method according to the embodiments of this disclosure from the perspective of the network exposure function-lite. Implementation details of the communication method according to the embodiments of this disclosure are described in detail below from the perspective of the base station or the operation administration and maintenance system of the base station with reference to FIG. 5.

Figure 5:
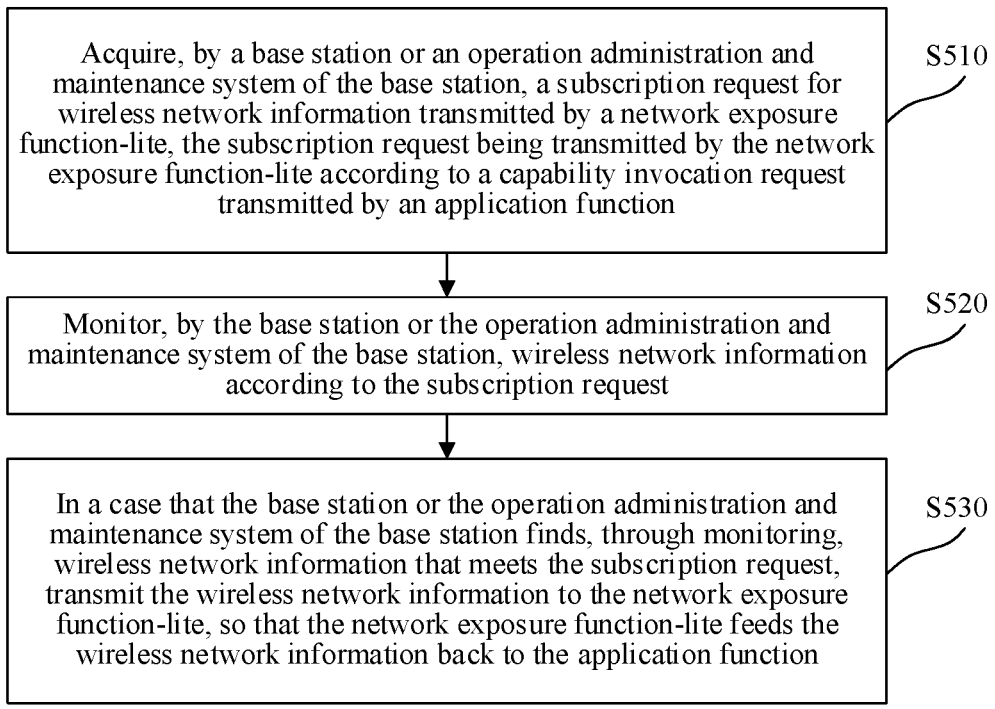
FIG. 5 is a flowchart of a communication method applied to an edge computing scenario according to an embodiment of this disclosure.

FIG. 5 is a flowchart of a communication method applied to an edge computing scenario according to an embodiment of this disclosure, and the edge computing scenario may be the edge computing scenario shown in FIG. 2 or FIG. 3. The communication method applied to an edge computing scenario may be performed by any base station (such as the base station 1 or the base station 2) shown in FIG. 2 or FIG. 3, or may be performed by the operation administration and maintenance system shown in FIG. 2. Referring to FIG. 5, the communication method applied to an edge computing scenario includes at least step S510 to step S530, which are described in detail as follows.

In step S510, a base station or an operation administration and maintenance system of the base station acquires a subscription request for wireless network information transmitted by a network exposure function-lite, the subscription request being transmitted by the network exposure function-lite according to a capability invocation request transmitted by an application function.

In some embodiments of this disclosure, when the system architecture shown in FIG. 2, that is, the network exposure function-lite is connected to the operation administration and maintenance system of the base station, and the communication method shown in FIG. 5 is performed by the operation administration and maintenance system of the base station, the operation administration and maintenance system may receive the subscription request from the network exposure function-lite. When the communication method shown in FIG. 5 is performed by the base station, the base station may receive the subscription request forwarded by the operation administration and maintenance system from the network exposure function-lite. When the system architecture shown in FIG. 3, that is, the network exposure function-lite is directly connected to the base station, the base station may directly receive the subscription request transmitted by the network exposure function-lite.

In step S520, the base station or the operation administration and maintenance system of the base station monitors wireless network information according to the subscription request.

In some embodiments of this disclosure, before the base station or the operation administration and maintenance system of the base station monitors wireless network information according to the subscription request, it may first determine whether to accept the subscription request according to information included in the subscription request. When determining to accept the subscription request, wireless network information is monitored according to the subscription request, and an acceptance notification message is returned to the network exposure function-lite. When determining that the subscription request needs to be rejected, a rejection notification message may be transmitted to the network exposure function-lite. In some embodiments of this disclosure, the rejection notification message may include a corresponding rejection reason.

In some embodiments of this disclosure, the base station or the operation administration and maintenance system of the base station may reject the subscription request when determining that a terminal does not access the base station according to a terminal identification included in the subscription request. The base station or the operation administration and maintenance system of the base station may accept the subscription request when determining that the terminal has accessed the base station according to the terminal identification included in the subscription request.

In step S530, when the base station or the operation administration and maintenance system of the base station finds, through monitoring, wireless network information that meets the subscription request, the wireless network information is transmitted to the network exposure function-lite, so that the network exposure function-lite feeds the wireless network information back to the application function.

In some embodiments of this disclosure, when the system architecture shown in FIG. 2, that is, the network exposure function-lite is connected to the operation administration and maintenance system of the base station, and the communication method shown in FIG. 5 is performed by the operation administration and maintenance, the operation administration and maintenance system will transmit, based on wireless side information reported by the base station and the subscription request, wireless network information that meets the subscription request to the network exposure function-lite. When the communication method shown in FIG. 5 is performed by the base station, the base station may transmit wireless network information that meets the subscription request to the operation administration and maintenance system according to the subscription request and the detected wireless side information, and then the operation administration and maintenance system forwards the wireless network information to the network exposure function-lite. When the system architecture shown in FIG. 3, that is, the network exposure function-lite is directly connected to the base station, the base station may directly transmit the wireless network information to the network exposure function-lite.

FIG. 4 and FIG. 5 respectively illustrate technical solutions of the embodiments of this disclosure from the perspectives of the network exposure function-lite and the base station. An interaction process between the various devices involved in the embodiments of this disclosure is described in detail below with reference to the system architectures shown in FIG. 2 and FIG. 3.

Figure 6:
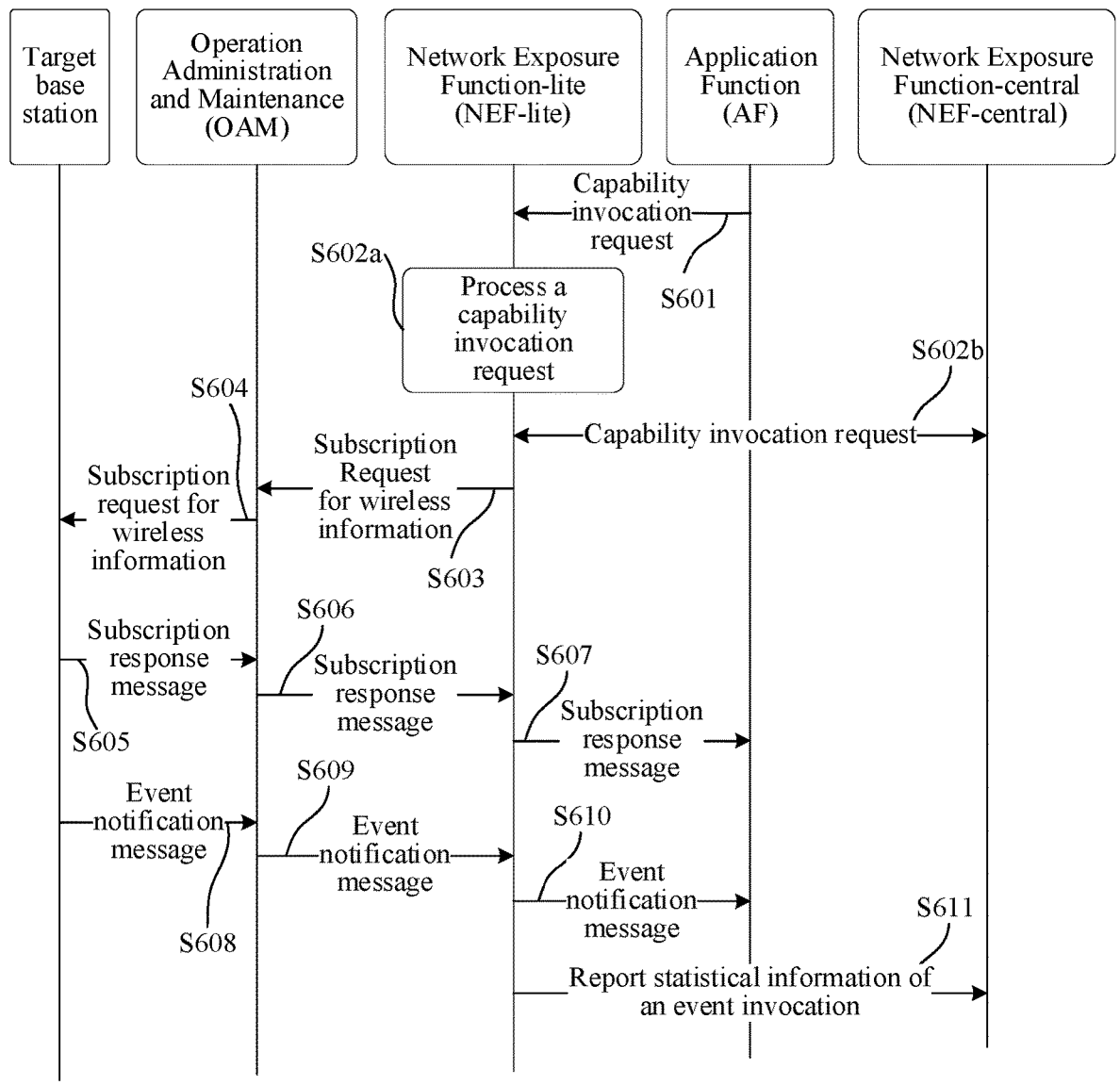
FIG. 6 is a flowchart of interactions between devices in the system architecture shown in FIG. 2.

In some embodiments of this disclosure, in the system architecture shown in FIG. 2, that is, in an application scenario where the network exposure function-lite is connected to the operation administration and maintenance system of the base station, the interaction process between the devices, as shown in FIG. 6, includes the following steps.

In step S601, a capability invocation request is transmitted, by an application function (AF), to a network exposure function-lite (NEF-lite). In some embodiments of this disclosure, the capability invocation request may include an event identification (such as wireless network information that needs to be acquired), event filter information (such as a signal threshold), event report information (such as a maximum number of reports and a minimum report interval), target information (such as a target UE identification, a target UE group identification, PDU session information, target cell information, target location area, and a target time period), AF information (such as address information of the AF), and the like.

In step S602a, the capability invocation request is processed by the NEF-lite after receiving the capability invocation request. In some embodiments, the network exposure function-lite may perform authorization verification on the request. When the authorization verification succeeds, the network exposure function-lite will perform further processing, such as converting an external ID of a user equipment (UE) included in the capability invocation request into an internal ID, converting an external group identification of the user equipment (UE) into an internal group identification, and determining information of corresponding one or more base stations according to the location information of the edge computing platform (MEC) where the application function (AF) is located, and regarding the information as the target base station.

In some embodiments of this disclosure, when NEF-lite cannot complete authorization on the capability invocation request, step S602b may be performed, that is, the network exposure function-lite transmits the capability invocation request to the network exposure function-central (NEF-central), then the NEF-central completes the authentication and authorization on the capability invocation request, and returns a result to the NEF-lite to indicate to the NEF-lite whether to accept the capability invocation request.

Regardless of whether the NEF-lite performs the authorization verification or the NEF-central performs the authorization verification, when determining that the capability invocation request needs to be rejected, a corresponding reason value may be returned to the AF. At the same time, when the capability invocation request of the AF is rejected, a capability invocation response is directly fed back to the AF, and the capability invocation response includes rejection information and a corresponding rejection reason.

In step S603, a subscription request for wireless information is transmitted, by the network exposure function-lite (NEF-lite), to the operation administration and maintenance (OAM) system according to the capability invocation request transmitted by the application function (AF). The subscription request may include an event identification (such as wireless network information that needs to be acquired), event filter information (such as a signal threshold), event report information (such as a maximum number of reports and a minimum report interval), target information (such as a target UE identification, a target UE group identification, PDU session information, target cell information, a target base station, and a target time period), and the like.

In step S604, the subscription request for wireless information is transmitted, by the OAM system after receiving the subscription request transmitted by the NEF-lite, to the target base station. The subscription request includes an event identification (such as wireless network information that needs to be acquired), event filter information (such as a signal threshold), event report information (such as a maximum number of reports and a minimum report interval), target information (such as a target UE identification, a target UE group identification, PDU session information, target cell information, and a target time period), and the like.

In step S605, a subscription response message is returned, by the target base station, to the OAM system, indicating whether the subscription request is accepted. When detecting that the target UE does not access the base station, the target base station will reject the subscription request. In some embodiments, when the base station rejects the subscription request, a reason for the rejection may be fed back in the subscription response message.

Steps S604 and S605 are optional steps. In some embodiments, when the OAM system may determine whether to accept the subscription request, the OAM system may directly determine whether to accept the subscription request, and transmit the wireless information subscription response to the NEF-lite.

In step S606, after the OAM system receives and responds to the subscription request (applicable to a scenario where the OAM determines whether to accept the subscription request), or after the subscription response message returned by the target base station in step S605 is received (applicable to a scenario where the base station determines whether to accept the subscription request), the subscription response message is returned to the NEF-lite to indicate whether the subscription request is accepted. In some embodiments, when the OAM rejects the subscription request, a corresponding reason may be returned.

In step S607, after receiving the subscription response message, the subscription response message is returned, by the NEF-lite, to the AF to indicate whether to accept the subscription request. In some embodiments, when the NEF-lite rejects the subscription request, a corresponding reason may be returned to the AF.

When steps S604 and S605 have been performed before, step S608 needs to be performed. When steps S604 and S605 have not been performed before, step S608 is not performed, and step S609 is performed directly.

In step S608, when the target base station detects that an event reporting condition is met, an event notification message is transmitted to the OAM system.

In step S609, whether the wireless information meets requirements in the event subscription request is detected, by the OAM system, and if yes, transmit an event notification message to the NEF-lite.

In step S610, the event notification message is transmitted by the NEF-lite, to the AF.

In step S611, statistical information of event invocation is reported, by the NEF-lite, to the NEF-central. This step is optional, and it is unnecessary to upload the statistical information of the event invocation.

Figure 7:
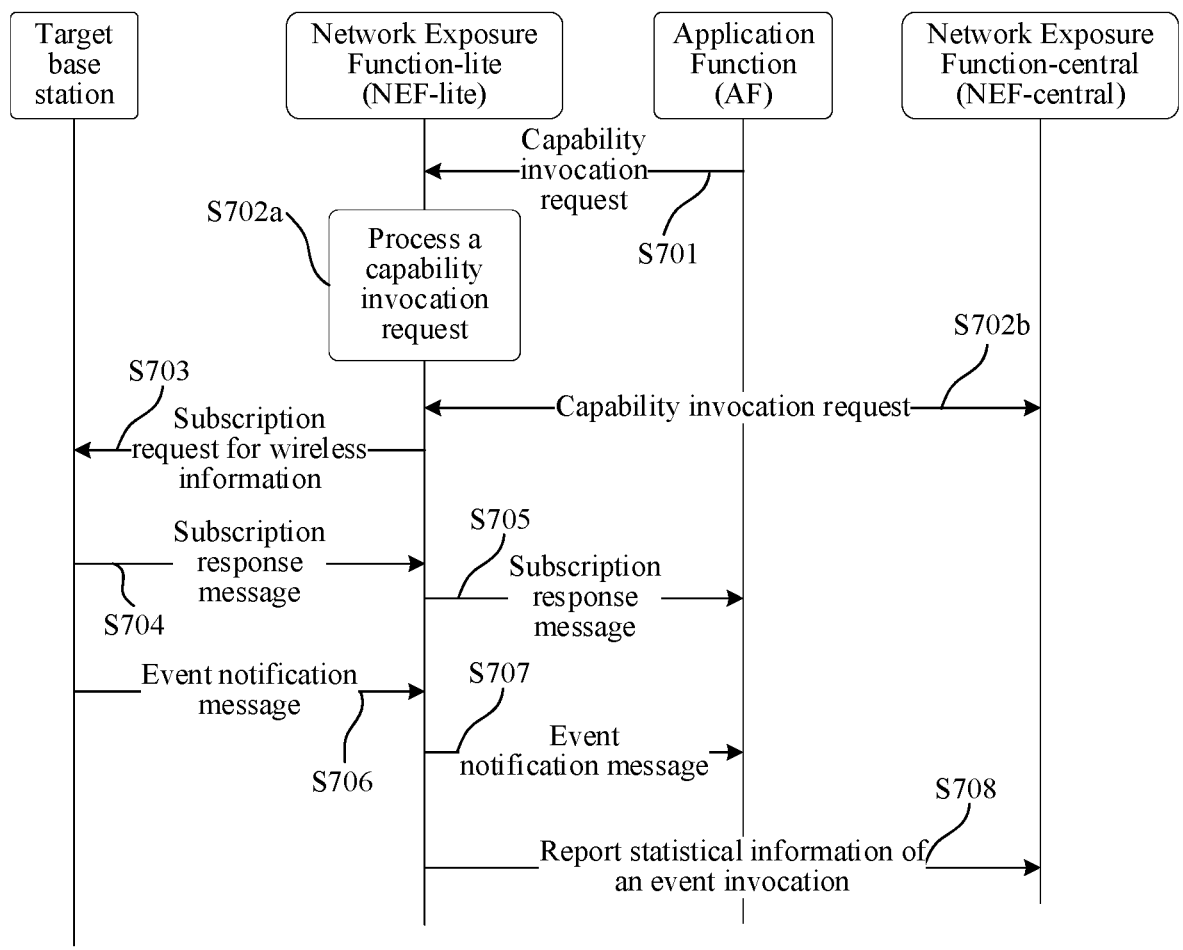
FIG. 7 is a flowchart of interactions between devices in the system architecture shown in FIG. 3.

In some embodiments of this disclosure, in the system architecture shown in FIG. 3, that is, in an application scenario where the network exposure function-lite is directly connected to the base station, the interaction process between the devices, as shown in FIG. 7, includes the following steps.

In step S701, a capability invocation request is transmitted, by an application function (AF), to a network exposure function-lite (NEF-lite). In some embodiments of this disclosure, the capability invocation request may include an event identification (such as wireless network information that needs to be acquired), event filter information (such as a signal threshold), event report information (such as a maximum number of reports and a minimum report interval), target information (such as a target UE identification, a target UE group identification, PDU session information, target cell information, target location area, and a target time period), AF information (such as address information of the AF), and the like.

In step S702a, the capability invocation request is processed by the NEF-lite after receiving the capability invocation request. In this disclosure, the NEF-lite may perform authorization verification on the request. When the authorization verification succeeds, the NEF-lite will perform further processing, such as converting an external ID of the user equipment (UE) included in the capability invocation request into an internal ID, converting an external group identification of the UE into an internal group identification, and determining information of corresponding one or more base stations according to the location information of the MEC where the AF is located, and regarding the information as the target base station.

In some embodiments of this disclosure, when NEF-lite cannot complete authorization on the capability invocation request, step S702b may be performed, that is, the NEF-lite transmits the capability invocation request to the network exposure function-central (NEF-central), then the NEF-central completes the authentication and authorization on the capability invocation request, and returns a result to the NEF-lite to indicate to the NEF-lite whether to accept the capability invocation request.

Regardless of whether the NEF-lite performs the authorization verification or the NEF-central performs the authorization verification, when determining that the capability invocation request needs to be rejected, a corresponding reason value may be returned to the AF. At the same time, when the capability invocation request of the AF is rejected, step S705 is performed directly, that is, a capability invocation response is directly fed back to the AF, and the capability invocation response includes rejection information and a corresponding rejection reason.

In step S703, a subscription request for wireless information is transmitted, by the NEF-lite, to the target base station according to the capability invocation request transmitted by the AF. The subscription request may include an event identification (such as wireless network information that needs to be acquired), event filter information (such as a signal threshold), event report information (such as a maximum number of reports and a minimum report interval), target information (such as a target UE identification, a target UE group identification, PDU session information, target cell information, and a target time period), and the like.

In step S704, a subscription response message is returned, by the target base station, to the NEF-lite, indicating whether the subscription request is accepted. When detecting that the target UE does not access the base station, the target base station will reject the subscription request. In some embodiments, when the target base station rejects the subscription request, a reason for the rejection may be fed back in the subscription response message.

In step S705, after receiving the subscription response message, the response message is returned, by the NEF-lite, to the AF to indicate whether to accept the subscription request. In some embodiments of this disclosure, when all target base stations reject the subscription request, a response message of rejecting the subscription request may be returned to the AF, which includes a corresponding reason, such as a specific reason value. When at least one target base station accepts the subscription request, a response message of accepting the subscription request is returned to the AF.

In step S706: When the target base station detects that an event reporting condition is met, an event notification message is transmitted to the NEF-lite.

In step S707, whether the notification message meets requirements in the event report information is checked by the NEF-lite, and if yes, the event notification message is transmitted to the AF.

In step S708, statistical information of event invocation to the NEF-central by the NEF-lite. This step is optional, and it is unnecessary to upload the statistical information of the event invocation.

The technical solution of the embodiment shown in FIG. 7 may further shorten the delay of capability exposure because the network exposure function-lite, that is, the NEF-lite, directly interacts with the base station.

In the technical solution according to the above embodiment of this disclosure, the network exposure function-lite is introduced and deployed in a location closer to the edge computing platform, and therefore, the delay for the application function to acquire subscribed wireless network information can be reduced, and the delay for network information exposure is also reduced, thereby meeting delay requirements of the application function in the edge computing platform on the network information.

An apparatus embodiment of this disclosure is introduced in the following, which may be used for performing the communication methods applied to an edge computing scenario in the above embodiments of this disclosure. For details not disclosed in the apparatus embodiment of this disclosure, reference may be made to the above embodiments of a communication method applied to an edge computing scenario according to this disclosure.

Figure 8:
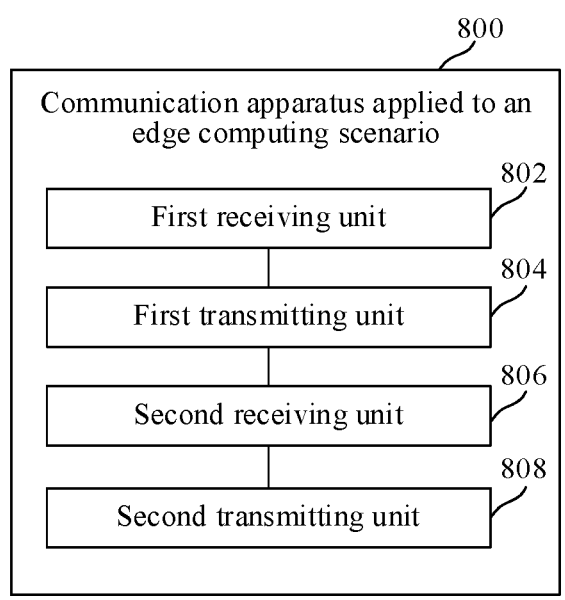
FIG. 8 is a block diagram of a communication apparatus applied to an edge computing scenario according to an embodiment of this disclosure.

FIG. 8 is a block diagram of a communication apparatus applied to an edge computing scenario according to some embodiments of this disclosure, the edge computing scenario may be the edge computing scenario shown in FIG. 2 or FIG. 3, and the communication apparatus is arranged in a network exposure function-lite.

Referring to FIG. 8, a communication apparatus 800 applied to an edge computing scenario according to an embodiment of this disclosure includes: a first receiving unit 802, a first transmitting unit 804, a second receiving unit 806, and a second transmitting unit 808. One or more units of the apparatus can be implemented by processing circuitry, software, or a combination thereof, for example.

The first receiving unit 802 is configured to receive a capability invocation request transmitted by the application function. The first transmitting unit 804 is configured to, when the capability invocation request used for requesting to acquire wireless network information, transmit a subscription request for wireless network information to an access network side based on the capability invocation request. The second receiving unit 806 is configured to receive wireless network information fed back by the access network side in response to the subscription request. The second transmitting unit 808 is configured to notify the application function of the wireless network information.

In some embodiments of this disclosure, based on the above solution, the first transmitting unit 804 is configured to perform authorization verification on an identity of the application function according to the capability invocation request; and when the authorization verification on the identity of the application function succeeds, transmit the subscription request to the access network side according to the capability invocation request.

In some embodiments of this disclosure, based on the above solution, the first transmitting unit 804 is further configured to, when the network exposure function-lite cannot complete authorization verification on the identity of the application function, transmit the capability invocation request to the network exposure function-central, so that the network exposure function-central performs authorization verification on the identity of the application function; receive an authorization verification result of the network exposure function-central on the identity of the application function; and when the authorization verification of the network exposure function-central on the identity of the application function succeeds, transmit the subscription request to the access network side according to the capability invocation request.

In some embodiments of this disclosure, based on the above solution, the first transmitting unit 804 is configured to determine information of at least one target base station corresponding to the subscription request according to address indication information included in the capability invocation request, the address indication information including at least one of the following: address information of the application function, information of a target cell, and information of a target location area; and transmit, based on the information of the at least one target base station, the subscription request to the at least one target base station or an operation administration and maintenance system of the at least one target base station.

In some embodiments of this disclosure, based on the above solution, the second receiving unit 806 is further configured to, before receiving wireless network information fed back by the access network side in response to the subscription request, receive a subscription response fed back by the access network side, the subscription response being used for indicating whether the access network side accepts the subscription request. The second transmitting unit 808 is further configured to feed the subscription response back to the application function.

In some embodiments of this disclosure, based on the above solution, the second transmitting unit 808 is further configured to, when the subscription response indicates that the access network side rejects the subscription request, feed rejection reason information back to the application function according to the subscription response. The communication apparatus 800 applied to an edge computing scenario further includes a detection unit configured to, when the subscription response indicates that the access network side accepts the subscription request, detect whether the wireless network information fed back by the access network side in response to the subscription request is received.

In some embodiments of this disclosure, based on the above solution, the access network side includes a base station and an operation administration and maintenance system connected to the base station, and the network exposure function-lite is connected to the operation administration and maintenance system; the first transmitting unit 804 is configured to transmit the subscription request to the operation administration and maintenance system based on the capability invocation request; and the second receiving unit 806 is configured to receive wireless network information transmitted by the operation administration and maintenance system.

In some embodiments of this disclosure, based on the above solution, the access network side includes a base station, and the network exposure function-lite is connected to the base station; the first transmitting unit 804 is configured to transmit the subscription request to the base station based on the capability invocation request; and the second receiving unit 806 is configured to receive wireless network information fed back by the base station in response to the subscription request.

In some embodiments of this disclosure, based on the above solution, the communication apparatus 800 applied to an edge computing scenario further includes a statistical unit configured to make statistics on the wireless network information requested to acquire by the application function to obtain a statistical result; and the second transmitting unit 808 is further configured to report the statistical result to the network exposure function-central.

In some embodiments of this disclosure, based on the above solution, the first receiving unit 802 is further configured to, after the capability invocation request transmitted by the application function is received, determine, according to an event identification included in the capability invocation request, whether the capability invocation request is used for requesting to acquire wireless network information; and the first transmitting unit 804 is further configured to, when the capability invocation request is not used for requesting to acquire wireless network information, forward the capability invocation request to the network exposure function-central.

Figure 9:
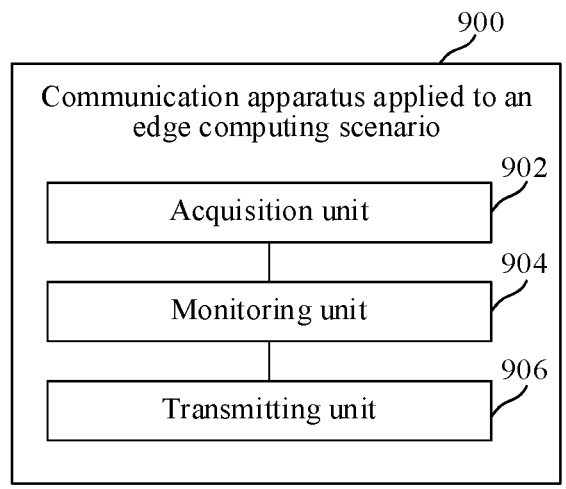
FIG. 9 is a block diagram of a communication apparatus applied to an edge computing scenario according to an embodiment of this disclosure.

FIG. 9 is a block diagram of a communication apparatus applied to an edge computing scenario according to some embodiments of this disclosure, the edge computing scenario may be the edge computing scenario shown in FIG. 2 or FIG. 3, and the communication apparatus is arranged in a base station or arranged in an operation administration and maintenance system of the base station.

Referring to FIG. 9, a communication apparatus 900 applied to an edge computing scenario according to some embodiments of this disclosure includes: an acquisition unit 902, a monitoring unit 904, and a transmitting unit 906. One or more units of the apparatus can be implemented by processing circuitry, software, or a combination thereof, for example.

The acquisition unit 902 is configured to acquire a subscription request for wireless network information transmitted by the network exposure function-lite, the subscription request being transmitted by the network exposure function-lite according to a capability invocation request transmitted by the application function. The monitoring unit 904 is configured to monitor wireless network information according to the subscription request. The transmitting unit 906 is configured to, when wireless network information meeting the subscription request is monitored, transmit the wireless network information to the network exposure function-lite, so that the network exposure function-lite feeds the wireless network information back to the application function.

In some embodiments of this disclosure, based on the above solution, the communication apparatus 900 applied to an edge computing scenario further includes a determination unit configured to determine whether to accept the subscription request according to information included in the subscription request. The monitoring unit 904 is further configured to, when the determination unit determines to accept the subscription request, monitor wireless network information according to the subscription request, and transmit an acceptance notification message to the network exposure function-lite. The transmitting unit 906 is further configured to, when the determination unit determines that the subscription request needs to be rejected, transmit a rejection notification message to the network exposure function-lite.

In some embodiments of this disclosure, based on the above solution, the determination unit is configured to, when determining that the terminal does not access the base station according to an identification of the terminal included in the subscription request, determine that the subscription request needs to be rejected; and when determining that the terminal has accessed the base station according to the identification of the terminal included in the subscription request, determine to accept the subscription request.

In some embodiments of this disclosure, based on the above solution, when the base station is connected to the network exposure function-lite, the acquisition unit 902 is configured to receive the subscription request transmitted by the network exposure function-lite.

In some embodiments of this disclosure, based on the above solution, when the operation administration and maintenance system of the base station is connected to the network exposure function-lite, and the communication apparatus 900 is arranged in the base station, the acquisition unit 902 is configured to receive the subscription request forwarded by the operation administration and maintenance system from the network exposure function-lite.

In some embodiments of this disclosure, based on the above solution, when the operation administration and maintenance system of the base station is connected to the network exposure function-lite, and the communication apparatus 900 is arranged in the operation administration and maintenance system of the base station, the acquisition unit 902 is configured to receive the subscription request transmitted by the network exposure function-lite.

Figure 10:
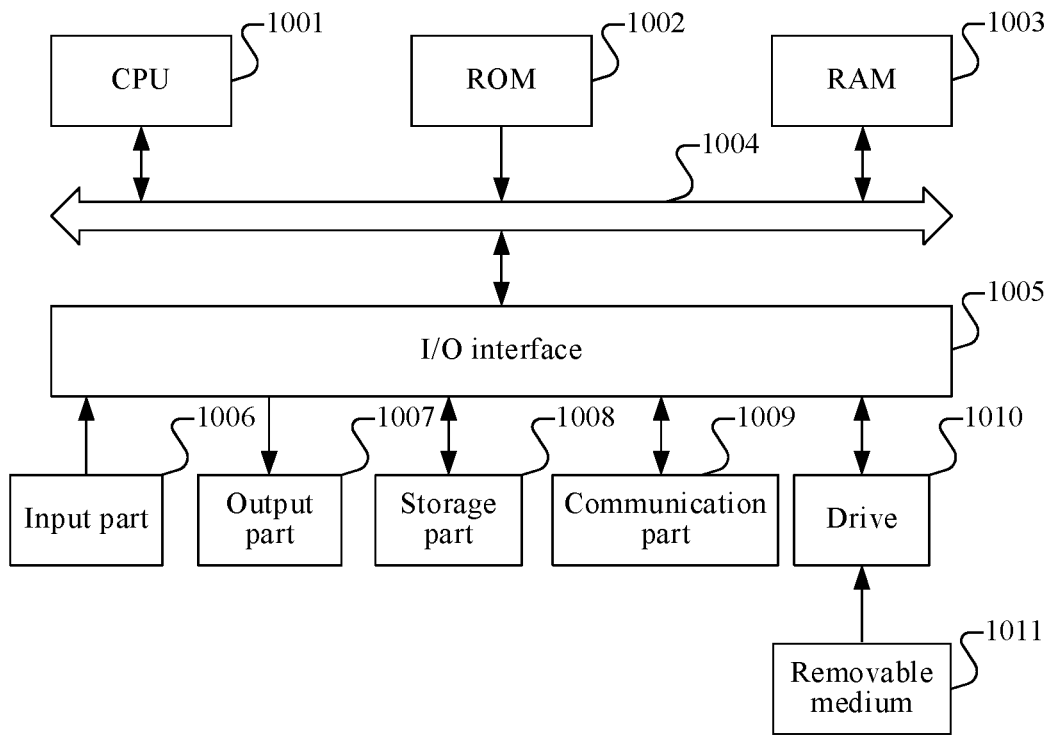
FIG. 10 is a schematic structural diagram of a computer system adapted to implement an electronic device according to an embodiment of this disclosure.

FIG. 10 is a schematic structural diagram of a computer system adapted to implement an electronic device according to an embodiment of this disclosure.

The computer system of the electronic device shown in FIG. 10 is merely an example, and does not constitute any limitation on functions and use ranges of the embodiments of this disclosure.

As shown in FIG. 10, the computer system includes processing circuitry such as a central processing unit (CPU) 1001, which may perform various suitable actions and processing based on a program stored in a read-only memory (ROM) 1002 or a program loaded from a storage part 1008 into a random access memory (RAM) 1003, for example, perform the method described in the foregoing embodiments. The RAM 1003 further stores various programs and data required for system operations. The CPU 1001, the ROM 1002, and the RAM 1003 are connected to each other through a bus 1004. An input/output (I/O) interface 1005 is also connected to the bus 1004.

The following components are connected to the I/O interface 1005: an input part 1006 including a keyboard and a mouse; an output part 1007 including a cathode ray tube (CRT), a liquid crystal display (LCD), and a speaker; a storage part 908 including hard disk; and a communication part 1009 including a network interface card such as a local area network (LAN) card or a modem. The communication part 1009 performs communication processing via a network such as the Internet. A driver 1010 is also connected to the I/O interface 1005 as required. A removable medium 1011, such as a magnetic disk, an optical disc, a magneto-optical disk, or a semiconductor memory, is installed on the drive 1010 as required, so that a computer program read from the removable medium is installed into the storage part 1008 as required.

Particularly, according to an embodiment of this disclosure, the processes described above by referring to the flowcharts may be implemented as computer software programs. For example, an embodiment of this disclosure includes a computer program product. The computer program product includes a computer program stored in a computer-readable medium. The computer program includes a computer program used for performing a method shown in the flowchart. In such an embodiment, the computer program may be downloaded and installed from a network through the communication part 1009, and/or installed from the removable medium 1011. When the computer program is executed by the CPU 1001, the various functions defined in the system of this disclosure are executed.

The computer-readable medium shown in the embodiments of this disclosure may be a computer-readable signal medium or a computer-readable storage medium or any combination thereof. The computer-readable storage medium may be, for example, but is not limited to, an electric, magnetic, optical, electromagnetic, infrared, or semi-conductive system, apparatus, or component, or any combination thereof. A more specific example of the computer-readable storage medium may include but is not limited to: an electrical connection having one or more wires, a portable computer magnetic disk, a hard disk, a RAM, a ROM, an erasable programmable read-only memory (EPROM), a flash memory, an optical fiber, a compact disc read-only memory (CD-ROM), an optical storage device, a magnetic storage device, or any appropriate combination thereof. In this disclosure, the computer-readable storage medium may be any tangible medium containing or storing a program, and the program may be used by or used in combination with an instruction execution system, apparatus, or device. In this disclosure, the computer-readable signal medium may include a data signal transmitted in a baseband or as part of a carrier, and stores a computer-readable computer program. The data signal propagated in such a way may assume a plurality of forms, including, but not limited to, an electromagnetic signal, an optical signal, or any appropriate combination thereof. The computer-readable signal medium may be further any computer-readable medium in addition to a computer-readable storage medium. The computer-readable medium may send, propagate, or transmit a program that is used by or used in combination with an instruction execution system, apparatus, or device. The computer program included in the computer-readable medium may be transmitted by using any suitable medium, including but not limited to: a wireless medium, a wire, or the like, or any suitable combination thereof.

The flowcharts and block diagrams in the accompanying drawings illustrate possible system architectures, functions, and operations that may be implemented by a system, a method, and a computer program product according to various embodiments of this disclosure. Each box in a flowchart or a block diagram may represent a module, a program segment, or a part of code. The module, the program segment, or the part of code includes one or more executable instructions used for implementing specified logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. Each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

Related units described in the embodiments of this disclosure may be implemented in a software manner, or may be implemented in a hardware manner, and the unit described can also be set in a processor. Names of the units do not constitute a limitation on the units in a specific case.

In another aspect, this disclosure further provides a computer readable medium. The computer readable medium may be included in the electronic device described in the above embodiments, or may exist alone without being assembled into the electronic device. The computer-readable medium can be a non-transitory computer-readable storage medium that carries one or more programs, the one or more programs, when executed by the electronic device, causing the electronic device to implement the method described in the foregoing embodiments.

Although a plurality of modules or units of a device configured to perform actions are discussed in the foregoing detailed description, such division is not mandatory. Actually, according to the implementations of this disclosure, the features and functions of two or more modules or units described above may be specifically implemented in one module or unit. Conversely, features and functions of one module or unit described above may be further divided into a plurality of modules or units for implementation.

According to the foregoing descriptions of the implementations, a person skilled in the art may readily understand that the exemplary implementations described herein may be implemented by using software, or may be implemented by combining software and necessary hardware. Therefore, the technical solutions of the implementations of this disclosure may be implemented in a form of a software product. The software product may be stored in a non-volatile storage medium (which may be a CD-ROM, a USB flash drive, a removable hard disk, or the like) or on a network, including several instructions for instructing a computing device (which may be a personal computer, a server, a touch terminal, a network device, or the like) to perform the methods according to the implementations of this disclosure.

After considering the specification and practicing the disclosed implementations, a person skilled in the art may readily conceive of other implementations of this disclosure. This disclosure is intended to cover any variations, uses, or adaptive changes of this disclosure following the general principles of this disclosure.

It is to be understood that this disclosure is not limited to the precise structures described above and shown in the accompanying drawings, and various modifications and changes may be made without departing from the scope of this disclosure.

What is claimed is:

1. A communication method of an edge computing platform in which an application function is deployed, the edge computing platform being connected to a network exposure function-lite, the network exposure function-lite being connected to a network exposure function-central deployed in a core network, the network exposure function-lite being deployed in a location closer to the edge computing platform than the core network, the communication method comprising:
   receiving a capability invocation request from the application function;
   when the capability invocation request corresponds to a request to acquire wireless network information, transmitting a subscription request for the wireless network information to an access network side based on the capability invocation request;
   receiving the wireless network information fed back by the access network side in response to the subscription request; and
   notifying, by processing circuitry of the network exposure function-lite, the application function of the wireless network information.

2. The communication method according to claim 1, wherein the transmitting the subscription request comprises:
   performing authorization verification on an identity of the application function according to the capability invocation request; and
   when the authorization verification on the identity of the application function succeeds, transmitting the subscription request to the access network side according to the capability invocation request.

3. The communication method according to claim 2, further comprising:
   when the authorization verification on the identity of the application function cannot be completed, transmitting the capability invocation request to the network exposure function-central, so that the network exposure function-central performs authorization verification on the identity of the application function;

receiving an authorization verification result of the network exposure function-central on the identity of the application function; and when the authorization verification of the network exposure function-central on the identity of the application function succeeds, transmitting the subscription request to the access network side according to the capability invocation request.

4. The communication method according to claim 2, wherein the transmitting the subscription request to the access network side comprises:

determining information of at least one target base station corresponding to the subscription request according to address indication information comprised in the capability invocation request, the address indication information comprising at least one of address information of the application function, information of a target cell, or information of a target location area; and transmitting, based on the information of the at least one target base station, the subscription request to one of the at least one target base station or an operation administration and maintenance system of the at least one target base station.

5. The communication method according to claim 1, wherein before the receiving the wireless network information fed back by the access network side, the communication method further comprises:

after the subscription request is transmitted to the access network side, receiving a subscription response fed back by the access network side, the subscription response indicating whether the access network side accepts the subscription request; and feeding the subscription response back to the application function.

6. The communication method according to claim 5, further comprising:

when the subscription response indicates that the access network side rejects the subscription request, feeding rejection reason information back to the application function according to the subscription response; and when the subscription response indicates that the access network side accepts the subscription request, detecting whether the wireless network information fed back by the access network side in response to the subscription request is received.

7. The communication method according to claim 1, wherein the access network side comprises a base station and an operation administration and maintenance system connected to the base station, and the network exposure function-lite is connected to the operation administration and maintenance system;

the transmitting the subscription request for the wireless network information to the access network side includes transmitting the subscription request to the operation administration and maintenance system based on the capability invocation request; and the receiving the wireless network information fed back by the access network side includes receiving the wireless network information from the operation administration and maintenance system.

8. The communication method according to claim 1, wherein the access network side comprises a base station, and the network exposure function-lite is connected to the base station;

the transmitting the subscription request for the wireless network information to the access network side includes transmitting the subscription request to the base station based on the capability invocation request; and the receiving the wireless network information fed back by the access network side includes receiving the wireless network information fed back by the base station in response to the subscription request.

9. The communication method according to claim 1, further comprising:

reporting statistical information of the wireless network information to the network exposure function-central.

10. The communication method according to claim 1, further comprising:

after the capability invocation request is received from the application function, determining, according to an event identification comprised in the capability invocation request, whether the capability invocation request corresponds to the request to acquire the wireless network information; and when the capability invocation request does not correspond to the request to acquire the wireless network information, forwarding the capability invocation request to the network exposure function-central.

11. A communication method of an edge computing platform in which an application function is deployed, the edge computing platform being connected to a network exposure function-lite, the network exposure function-lite being connected to a network exposure function-central deployed in a core network, the network exposure function-lite being deployed in a location closer to the edge computing platform than the core network, the communication method comprising:

acquiring, by processing circuitry of a base station, a subscription request for wireless network information transmitted by the network exposure function-lite, the subscription request being transmitted by the network exposure function-lite according to a capability invocation request transmitted by the application function;

monitoring the wireless network information according to the subscription request; and when the wireless network information meeting the subscription request is monitored, transmitting the wireless network information to the network exposure function-lite, so that the network exposure function-lite feeds the wireless network information back to the application function.

12. The communication method according to claim 11, wherein before the monitoring the wireless network information, the communication method further comprises:

determining whether to accept the subscription request according to information comprised in the subscription request;

based on a determination to accept the subscription request, monitoring the wireless network information according to the subscription request, and transmitting an acceptance notification message to the network exposure function-lite; and based on a determination to reject the subscription request, transmitting a rejection notification message to the network exposure function-lite.

13. The communication method according to claim 12, wherein the determining whether to accept the subscription request comprises:

based on a determination that a terminal does not access the base station according to an identification of the terminal comprised in the subscription request, determining that the subscription request is to be rejected; and based on a determination that the terminal has accessed the base station according to the identification of the terminal comprised in the subscription request, determining to accept the subscription request.

14. The communication method a according to claim 11, wherein
when the base station is connected to the network exposure function-lite, the acquiring the subscription request for the wireless network information includes receiving a subscription request transmitted by the network exposure function-lite;
when an operation administration and maintenance system of the base station is connected to the network exposure function-lite, and the communication method is performed by the base station, the acquiring the subscription request for the wireless network information includes receiving the subscription request forwarded by the operation administration and maintenance system from the network exposure function-lite; and
when the operation administration and maintenance system of the base station is connected to the network exposure function-lite, and the communication method is performed by the operation administration and maintenance system of the base station, the acquiring the subscription request for the wireless network information includes receiving the subscription request transmitted by the network exposure function-lite.

15. A communication apparatus for a network exposure function-lite of an edge computing platform in which an application function is deployed, the edge computing platform being configured to connect to the network exposure function-lite, and the network exposure function-lite being configured to connect to a network exposure function-central deployed in a core network, the network exposure function-lite being deployed in a location closer to the edge computing platform than the core network, the communication apparatus comprising:
processing circuitry configured to:
receive a capability invocation request from the application function;
when the capability invocation request corresponds to a request to acquire wireless network information, transmit a subscription request for the wireless network information to an access network side based on the capability invocation request;
receive the wireless network information fed back by the access network side in response to the subscription request; and
notify the application function of the wireless network information.

16. The communication apparatus according to claim 15, wherein the processing circuitry is configured to:
perform authorization verification on an identity of the application function according to the capability invocation request; and
when the authorization verification on the identity of the application function succeeds, transmit the subscription request to the access network side according to the capability invocation request.

17. A communication apparatus for a base station of an edge computing platform in which an application function is deployed, the edge computing platform being configured to connect to a network exposure function-lite, the network exposure function-lite being configured to connect to a network exposure function-central deployed in a core network, the network exposure function-lite being deployed in a location closer to the edge computing platform than the core network, the communication apparatus comprising:
processing circuitry configured to:
acquire a subscription request for wireless network information transmitted by the network exposure function-lite, the subscription request being transmitted by the network exposure function-lite according to a capability invocation request transmitted by the application function;
monitor the wireless network information according to the subscription request; and
when the wireless network information meeting the subscription request is monitored, transmit the wireless network information to the network exposure function-lite, so that the network exposure function-lite feeds the wireless network information back to the application function.

18. The communication apparatus according to claim 17, wherein the processing circuitry is configured to:
determine whether to accept the subscription request according to information comprised in the subscription request;
based on a determination to accept the subscription request, monitor the wireless network information according to the subscription request, and transmit an acceptance notification message to the network exposure function-lite; and
based on a determination to reject the subscription request, transmit a rejection notification message to the network exposure function-lite.

19. A non-transitory computer-readable storage medium storing instructions which when executed by a processor cause the processor to perform the communication method according to claim 1.

20. A non-transitory computer-readable storage medium storing instructions which when executed by a processor cause the processor to perform the communication method according to claim 11.

* * * * *